US012573862B2

(12) United States Patent
Kudo

(10) Patent No.: US 12,573,862 B2
(45) Date of Patent: Mar. 10, 2026

(54) CHARGING CIRCUIT

(71) Applicant: ROHM CO., LTD., Kyoto (JP)

(72) Inventor: Masaya Kudo, Kyoto (JP)

(73) Assignee: ROHM CO., LTD, Kyoto (JP)

( * ) Notice: Subject to any disclaimer, the term of this patent is extended or adjusted under 35 U.S.C. 154(b) by 1023 days.

(21) Appl. No.: 17/702,204

(22) Filed: Mar. 23, 2022

(65) Prior Publication Data

US 2022/0311259 A1    Sep. 29, 2022

(30) Foreign Application Priority Data

Mar. 26, 2021    (JP) ................................. 2021-053976

(51) Int. Cl.
*H02J 7/00*    (2006.01)
(52) U.S. Cl.
CPC ........ *H02J 7/00308* (2020.01); *H02J 7/0019* (2013.01); *H02J 7/007182* (2020.01)
(58) Field of Classification Search
USPC ........................................................ 320/134
See application file for complete search history.

(56) References Cited

U.S. PATENT DOCUMENTS 6,040,683 A * 3/2000 Mottier ............... H02J 7/00712
320/137
10,871,793 B2 * 12/2020 Namekawa ............. G05F 1/573

2010/0301811 A1    12/2010 Aiura
2013/0307490 A1 * 11/2013 Amemiya ........... H02J 7/00304
320/162
2014/0239928 A1 * 8/2014 Taniguchi ................. G05F 1/56
323/273
2020/0379492 A1 * 12/2020 Sakaguchi .............. G05F 1/575

FOREIGN PATENT DOCUMENTS

JP    2015043648 A    3/2015
JP    2017184598 A    10/2017

OTHER PUBLICATIONS

CNIPA Notice of Reasons for Refusal with Search Report for corresponding CN Application No. 202210251904.6; Issued Jul. 30, 2025; 21 pages.

* cited by examiner

*Primary Examiner* — Samuel Berhanu
(74) *Attorney, Agent, or Firm* — CANTOR COLBURN LLP

(57) ABSTRACT

The present disclosure provides a charging circuit capable of operating stably under a charging current of a wide range. A first transistor is connected between an input terminal and an output terminal. A current setting terminal is connected to an external current setting resistor. A second transistor is connected between the input terminal and the current setting terminal, and has a gate connected to a gate of the first transistor. A constant current feedback circuit feedback-controls a gate voltage of the first transistor in a manner that a voltage of the current setting terminal approaches a reference voltage. The constant current feedback circuit is configured in a manner that a phase compensation parameter is variable according to a current flowing through the first transistor.

15 Claims, 12 Drawing Sheets

CHARGING CIRCUIT

CROSS REFERENCES TO RELATED APPLICATIONS

The present invention claims priority under 35 U.S.C. § 119 to Japanese Application, 2021-053976, filed on Mar. 26, 2021, the entire contents of which being incorporated herein by reference.

TECHNICAL FIELD

The present disclosure relates to a charging circuit of a secondary battery.

BACKGROUND

A battery driven device represented by a cellphone terminal, a smartphone, a tablet terminal, a laptop computer or a portable audio player includes a rechargeable secondary battery. The secondary battery can be charged by a charging circuit built in an electronic device or an external charger.

A charging circuit operates in a current constant (CC) mode when a battery voltage is low and charges the battery by a constant current, and operates in a constant voltage (CV) mode if the battery is almost fully charged so as to adjust the charging current such that the battery voltage approaches a target voltage of a fully charged state.

PRIOR ART DOCUMENT

Patent Publication

[Patent document 1] Japan Patent Publication No. 2017-184598
[Patent document 2] Japan Patent Publication No. 2015-43648

SUMMARY

Problems to be Solved by the Present Disclosure

A designer of an electronic device or a charger wishes to individually designate the amount of a charging current in the CC mode according to the type or model of a battery. In response to the requirement above, a charging circuit is configured to be capable of setting the amount of a charging current in the CC mode.

The charging circuit includes a feedback loop that maintains the amount of a charging current in the CC mode at a target amount, wherein the stability of the feedback loop is greatly affected by the target amount of the charging current. Thus, if a wide range can be set for the charging current, the stability (that is, a phase margin or a gain margin) needs to be ensured within the wider range of currents, resulting in design complications of the feedback loop.

The present disclosure is completed in view of the situation above. It is an illustrative object of one aspect of the present disclosure to provide a charging circuit capable of operating stably under a charging current of a wide range.

Technical Means for Solving the Problem

According to an aspect of the present disclosure, a charging circuit includes: an input terminal; an output terminal; a first transistor, connected between the input terminal and the output terminal; a current setting terminal, to which an external current setting resistor is connectable; a second transistor, connected between the input terminal and the current setting terminal, and having a gate connected to a gate of the first transistor; and a constant current feedback circuit, feedback-controlling a gate voltage of the first transistor in a manner that a voltage of the current setting terminal approaches a reference voltage. The constant current feedback circuit is configured in a manner that a phase compensation parameter is variable according to a current flowing through the first transistor.

Moreover, configurations obtained from any combination of the elements above, and configurations obtained from conversions between expressions of the elements in terms of methods, devices and systems of the present disclosure may also effectively serve as embodiments of the present disclosure.

Effects of the Present Disclosure

According to an aspect of the present disclosure, a charging circuit is capable of operating stably under a charging current of a wide range.

DETAILED DESCRIPTION OF THE EMBODIMENTS

Summary of the Embodiments

Figure 1:
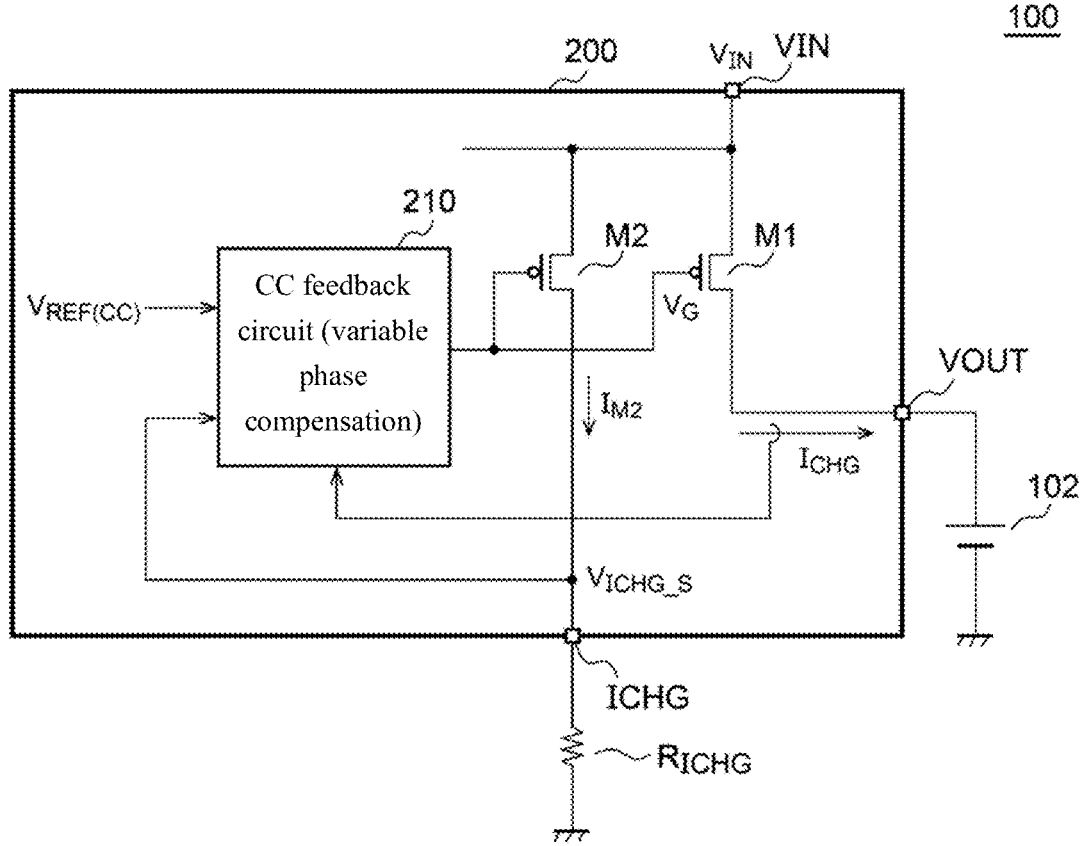
FIG. 1 is a block diagram of an electronic device including a charging circuit according to an embodiment.

A summary of several exemplary embodiments of the present disclosure is given below. The summary serves as the preamble of the detailed description to be given shortly, and aims to provide fundamental understanding of the embodiments by describing several concepts of one or more embodiments in brief. It should be noted that the summary is not to be construed as limitations to the scope of the present disclosure. Moreover, the summary does not necessarily encompass all embodiments that can be taken into account, and does not provide definitions for essential constituent elements of the embodiments. For the sake of better description, "one embodiment" sometimes refers to one embodiment (an implementation example or a variation example) or multiple embodiments (implementation examples or variation examples) disclosed in this specification.

The summary is not a general summary of all embodiments that can be taken into account, nor does it intend to specify important elements or specific important elements of all embodiments or to define the scope of or all aspects. The preamble of the more detailed description below aims to solely present some concepts of one or more embodiments in a simplified form.

A charging circuit according to an embodiment includes: an input terminal; an output terminal; a first transistor, connected between the input terminal and the output terminal; a current setting terminal, to which an external current setting resistor is connectable; a second transistor, connected between the input terminal and the current setting terminal, and having a gate connected to a gate of the first transistor; and a constant current feedback circuit, feedback-controlling a gate voltage of the first transistor in a manner that a voltage of the current setting terminal approaches a reference voltage. The constant current feedback circuit is configured in a manner that a phase compensation parameter is variable according to a current flowing through the first transistor.

In a resistance value of the current setting resistor, a current proportional to the charging current flowing through the first transistor and the output terminal flows, and so a voltage of the current setting terminal, that is, a voltage drop Vs of the current setting resistor, is proportional to a charging current $I_{CHG}$ and a resistance value $R_{ICHG}$ of the current setting resistor.

$$V_S = A \times I_{CHG} \times R_{ICHG}$$

When the voltage $V_S$ is stabilized into a reference voltage $V_{REF}$ by the constant current feedback circuit, the charging current $I_{CHG}$ is stabilized to a target current $I_{CHG(REF)}$ below.

$$I_{CHG(REF)} = V_{REF} / (A \times R_{ICHG})$$

That is to say, the charging current $I_{CHG}$ can be set to be inversely proportional to the resistance value of the current setting resistor.

Herein, the current setting resistor and its peripheral parasitic capacitance together produce a pole. The position of the pole shifts according to the resistance value of the current setting resistor. According to the configuration above, the phase compensation parameter of the constant current feedback circuit is variable according to the current flowing through the first transistor, in other words, according to the resistance value of the current setting resistor, so that a phase margin and a gain margin can be ensured to ensure stability of a current of a wide range.

In one embodiment, the constant current feedback circuit may include: a third transistor, having a first end connected to the input terminal and a second end connected to the gate of the first transistor; a constant current load, connected between the second end of the third transistor and a ground; and a differential amplifier, receiving the voltage of the current setting terminal and the reference voltage, and having an output node connected to a control terminal of the third transistor. In the configuration above, a pole of a first stage of the differential amplifier is included in an emitter-grounded type or source-grounded type amplification stage including the third transistor and the constant current load, and a pole of a second stage is formed by the second transistor and the current setting resistor to form a pole of a third stage. The phase compensation parameter of the first stage or the second stage is dynamically variable according to shifting of the pole of the third stage, hence ensuring stability.

In one embodiment, the constant current feedback circuit may further include a first resistor and a first capacitor connected in series and between the control terminal of the third transistor and the second end. At least one of a resistance of the first resistor and a capacitance of the first capacitor is the phase compensation parameter, which is variable. In this case, the position of a zero point is shifted according to the position of the pole determined by the current setting resistor.

In one embodiment, the first resistor may also include a first resistor element, and a series transistor and a second resistor element connected in series and between both ends of the first resistor element. A state of the series transistor may change according to the current flowing through the first transistor.

In one embodiment, the constant current feedback circuit may further include: a third transistor, having a first end connected to the input terminal and a second end connected to the gate of the first transistor; a constant current load, connected between the second end of the third transistor and a ground; a differential amplifier, receiving the voltage of the current setting terminal and the reference voltage, and having an output node connected to a control terminal of the third transistor; a first resistor element and a first capacitor, connected in series and between the control terminal of the third transistor and the second end; a first P-type transistor and a second resistor element, connected in series and between both ends of the first resistor element; a fourth transistor, having a gate connected to the gate of the first transistor and a source connected to a source of the first transistor; a current mirror circuit, having an input node connected to the fourth transistor and an output node connected to the first P-type transistor; and an impedance circuit, connected between the input terminal and the output node of the current mirror circuit. Accordingly, the position of a zero point can be set according to the position of the pole determined by the current setting resistor.

In one embodiment, the impedance circuit may include a second P-type transistor in which a gate/drain is connected.

In one embodiment, the constant current feedback circuit may supply a current proportional to the current flowing through the first transistor to the control terminal of the third transistor. Accordingly, a mirror current gets larger as the charging current increases, that is, as the current setting resistor gets smaller, so that the gain can be reduced and the gain margin can be increased.

In one embodiment, a gain of the differential amplifier may also be the phase compensation parameter, which is variable. The position of the pole determined by the gain of the differential amplifier can be changed according to the position of the pole determined by the current setting resistor.

In one embodiment, the differential amplifier may include: a differential input stage, and an emitter-grounded type or source-grounded type amplification stage that amplifies an output of the differential input stage. The constant current feedback circuit may be configured in a manner that an output impedance of the amplification stage is variable according to the current flowing through the first transistor.

In one embodiment, a collector load or a drain load of the amplification stage may be variably configured. In one embodiment, an impedance of a grounded emitter transistor or a grounded source transistor of the amplification stage may be variably configured.

In one embodiment, the constant current feedback circuit may include a fourth transistor, which has a gate connected to the gate of the first transistor and a source connected to a source of the first transistor. The phase compensation parameter of the constant current feedback circuit may change according to a current of the fourth transistor. In the fourth transistor, a current corresponding to the charging current flowing through the first transistor flows, in other words, a current corresponding to the resistance value of the current setting resistor flows. Thus, the phase compensation parameter of the constant current feedback circuit can be appropriately controlled with reference to the current of the fourth transistor.

In one embodiment, the constant current feedback circuit may include a sense resistor connected in series with the first transistor. The phase compensation parameter of the constant current feedback circuit may change according to a voltage drop of the sense resistor.

In one embodiment, the charging circuit may further include a voltage balance circuit connected between the second transistor and the current setting terminal to bring a voltage at one end of the second transistor closer to a voltage of the output terminal. Accordingly, a drain-source voltage of the second transistor can approach a drain-source voltage of the first transistor, so that the charging current can be monitored with high precision.

In one embodiment, the charging circuit may further include a constant voltage feedback circuit that feedback-controls the gate voltage of the first transistor such that a voltage of the output terminal approaches a second reference voltage.

Embodiments

Details of appropriate embodiments are given with the accompanying drawings below. The same or equivalent constituting elements, parts and processes are represented by the same denotations, and repeated description is omitted as appropriate. Moreover, the embodiments are illustrative and are non-limiting to the present disclosure. All features and combinations thereof described in the embodiments are not necessarily intrinsic characteristics of the present disclosure.

In this specification, an expression "a state of component A connected to component B" includes a situation where component A and component B are directly connected, or a situation where component A is indirectly connected to component B via another component, and the indirect connection does not result in substantial influences on their electrical connection or does not impair functions or effects exerted by their connection.

Similarly, an expression "a state of component C disposed between component A and component B" or "a stage of component C connected between component A and component B" includes, in addition to a situation where component A and component C, or component B and component C are directly connected, an indirect connection via another component, and the indirect connection does not result in substantial influences on their electrical connection or does not impair functions or effects exerted by their connection.

FIG. 1 shows a block diagram of an electronic device 100 including a charging circuit 200 according to an embodiment. The electronic device 100 includes a battery 102 and the charging circuit 200. The battery 102 is a repeatedly rechargeable secondary battery, and is, for example, a lithium ion battery or lithium ion polymer battery, a nickel hydride battery or a nickel cadmium battery.

In the charging circuit 200, an input terminal VIN receives a direct-current (DC) input voltage $V_{IN}$, and an output terminal VOUT is connected to the battery 102. The charging circuit 200 supplies a charging current $I_{CHG}$ to the battery 102, and charges the battery 102. The charging circuit 200 is an integrated circuit (IC) integrated on a semiconductor substrate.

The charging circuit 200 includes a charging current setting terminal (to be simply referred to as a current setting terminal below) ICHG. The current setting terminal ICHG is connected to an external current setting resistor $R_{ICHG}$. A charging current $I_{CHG}$ generated by the charging circuit 200 can be set according to a resistance value of the current setting resistor $R_{ICHG}$, wherein the resistance value of the current setting resistor $R_{ICHG}$ is determined based on a standard of the battery 102 by a designer of the electronic device 100. In other words, regardless of the resistance value of the resistor $R_{ICHG}$ connected to the current setting terminal ICHG, the charging circuit 200 is required to operate stably without any vibration. Moreover, in this specification, the term "terminal" may refer to a pin of an integrated circuit package, or may be an electrode of a die (chip) in an integrated circuit package.

In general, the charging circuit 200 can switch between a constant current (CC) mode and a constant voltage (CV) mode according to a voltage $V_{BAT}$ of the battery 102; however, a configuration associated with the CC mode is depicted in FIG. 1 and a configuration associated with the CV mode is omitted.

The charging circuit 200 includes a first transistor M1, a second transistor M2 and a constant current feedback circuit 210. The first transistor M1 is a P-channel metal oxide semiconductor field effect transistor (MOSFET), and is connected between the input terminal VIN and the output terminal VOUT. The first transistor M1 may also be a PNP bipolar transistor. A current flowing through the first transistor M1 is the charging current $I_{CHG}$. When the charging circuit 200 is in the CC mode, the charging current $I_{CHG}$ is stabilized by means of adjusting a gate voltage $V_G$ of the first transistor M1 to the target current $I_{CHG(REF)}$.

The second transistor M2 is of the same type as the first transistor M1, and is connected between the input terminal VIN and the current setting terminal ICHG. A gate of the second transistor M2 is connected to a gate of the first transistor M1. A current $I_{M2}$ proportional to the charging current $I_{CHG}$ flowing through the first transistor M1 flows through the second transistor M2.

$$I_{M2}=A \times I_{CHG}$$

The coefficient A is determined according to sizes of the first transistor M1 and the second transistor M2. For example, when a size ratio of the first transistor M1 to the second transistor M2 is 1000:1, A=1/1000.

A voltage drop is produced if the current $I_{M2}$ flows through the current setting resistor $R_{ICHG}$. The voltage drop is reflected as a voltage signal $V_{ICHG\_S}$ at the current setting terminal ICHG.

$$V_{ICHG\_S}=R_{ICHG} \times I_{M2}=R_{ICHG} \times A \times I_{CHG}$$

The voltage signal $V_{ICHG\_S}$ is fed back to the constant current feedback circuit 210. The constant current feedback circuit 210 feedback-controls the gate voltage $V_G$ of the first transistor M1 in a manner that the voltage $V_{ICHG\_S}$ of the current setting terminal approaches a reference voltage $V_{REF(CC)}$.

With the feedback of the constant current feedback circuit 210, $V_{REF(CC)}=V_{ICHG\_S}$ is established, and thus the charging current $I_{CHG}$ is stabilized to the target current $I_{CHG(REF)}$ represented by an equation below.

$$I_{CHG(REF)}=V_{REF(CC)}/(R_{ICHG}\times A)$$

That is to say, the set value $I_{CHG(REF)}$ of the charging current of the charging circuit 200 is inversely proportional to the resistance value of the current setting resistor $R_{ICHG}$.

The current setting resistor $R_{ICHG}$ and its peripheral parasitic capacitance together produce a pole. In general, in a semiconductor chip, each terminal has an electrostatic discharge (ESD) protection element (a diode), but a parasitic capacitance Cp of the ESD protection element and the current setting resistor $R_{ICHG}$ together form one factor producing a pole. When the charging current $I_{CHG}$ is variable within a range between 1 mA and 300 mA, the position (frequency) of a pole generates a change that is 300 times. If a fluctuation in a power supply voltage or a fluctuation in the temperature is further considered, the frequency of the pole may even change within a range (a range between 1 kHz and 1 MHz, for example) of 1000 times.

To ensure the stability of the feedback loop, a zero point is usually introduced by phase compensation. When the pole changes within a range of 1000 times, it may be too difficult to ensure the stability of a feedback loop by the same phase compensation.

Thus, adaptive phase compensation is introduced in this embodiment. More specifically, the constant current feedback circuit 210 is configured in a manner that a phase compensation parameter is adaptively variable according to the charging current $I_{CHG}$ flowing through the first transistor M1.

As described above, the charging current $I_{CHG}$ is set according to the current setting resistor $R_{ICHG}$, and thus the charging current $I_{CHG}$ flowing through the first transistor M1 represents a size of the current setting resistor $R_{ICHG}$, in other words, representing the position of a pole. Thus, by configuring the phase compensation parameter of the constant current feedback circuit 210 to dynamically and adaptively change according to the charging current $I_{CHG}$, the position of a zero point is changed according to the position of the pole, or a loop gain is changed according to the position of the pole, thereby ensuring a phase margin or a gain margin.

A specific example of a variable phase compensation parameter is to be described below, wherein the phase compensation parameter is exemplified by a circuit constant, an operating point or a modification of a circuit configuration that helps stabilizing the feedback loop.

The present disclosure can be conceivable based on the block diagram or circuit diagram in FIG. 1, or relates to various devices and methods that are derived from the description and are not limited to specific configurations. More specific configuration examples or embodiments are to be described below to help better understand the essentials or operations of the present disclosure and to clarify such essentials or operations rather than restraining the scope of the present disclosure.

Figure 2:
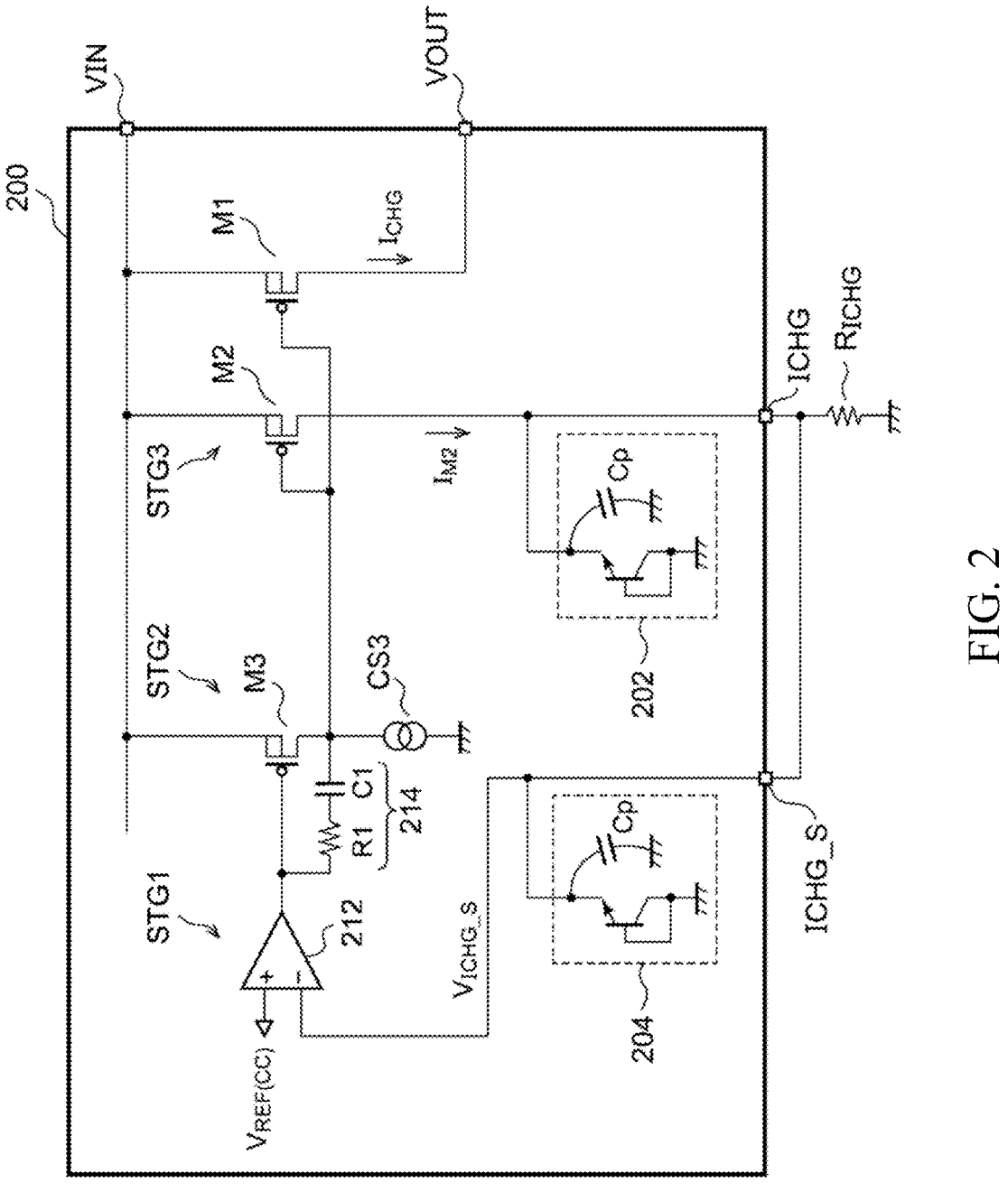
FIG. 2 is a circuit diagram of a specific configuration example of a charging circuit.

FIG. 2 shows a circuit diagram of a specific configuration example of the charging circuit 200. The constant current feedback circuit 210 further includes a third transistor M3 and a constant current load CS3.

The third transistor M3 is a P-channel MOSFET, and has a first terminal (a source) connected to the input terminal VIN. The constant current load CS3 is connected between a second end (a drain) of the third transistor M3 and a ground.

A connection node of the third transistor M3 and the constant current load CS3 is connected to the gate of the first transistor M1.

In a differential amplifier (error amplifier) 212, a non-inverting input terminal (+) receives the reference voltage $V_{REF(CC)}$, and an inverting input terminal (−) receives the voltage of the current setting terminal ICHG. In this example, a sense terminal ICHG_S having a potential equal to that of the current setting terminal ICHG is provided, and a voltage $V_{ICHG\_S}$ of the sense terminal ICHG_S is supplied to the inverting input terminal (−) of the differential amplifier 212. An output of the differential amplifier 212 is connected to a control terminal (a gate) of the third transistor M3.

The charging circuit 200 may be regarded as a three-stage amplifier. That is, a first stage STG1 is the differential amplifier 212, a second stage STG2 is a source-grounded type amplifier including the third transistor M3 and the constant current load CS3, and a third stage is a source-grounded type amplifier including the second transistor M2 and the current setting resistor $R_{ICHG}$. In the three-stage amplifier, a pole is introduced to each of the first stage, the second stage and the third stage. A phase compensation circuit 214 is disposed in the constant current feedback circuit 210.

The phase compensation circuit 214 includes a first resistor R1 and a first capacitor C1 connected in series between the control terminal (the gate) and a second end (a drain) of the third transistor M3, in other words, between an input and an output of the second-stage amplification stage (M3 and CS3).

A pole (a third pole) generated in the third stage is determined according to the current setting resistance $R_{ICHG}$ and the parasitic capacitance Cp. The parasitic capacitance Cp may include parasitic capacitances of ESD protection elements 202 and 204 disposed at the terminal ICHG or the terminal ICHG_S.

Figure 3:
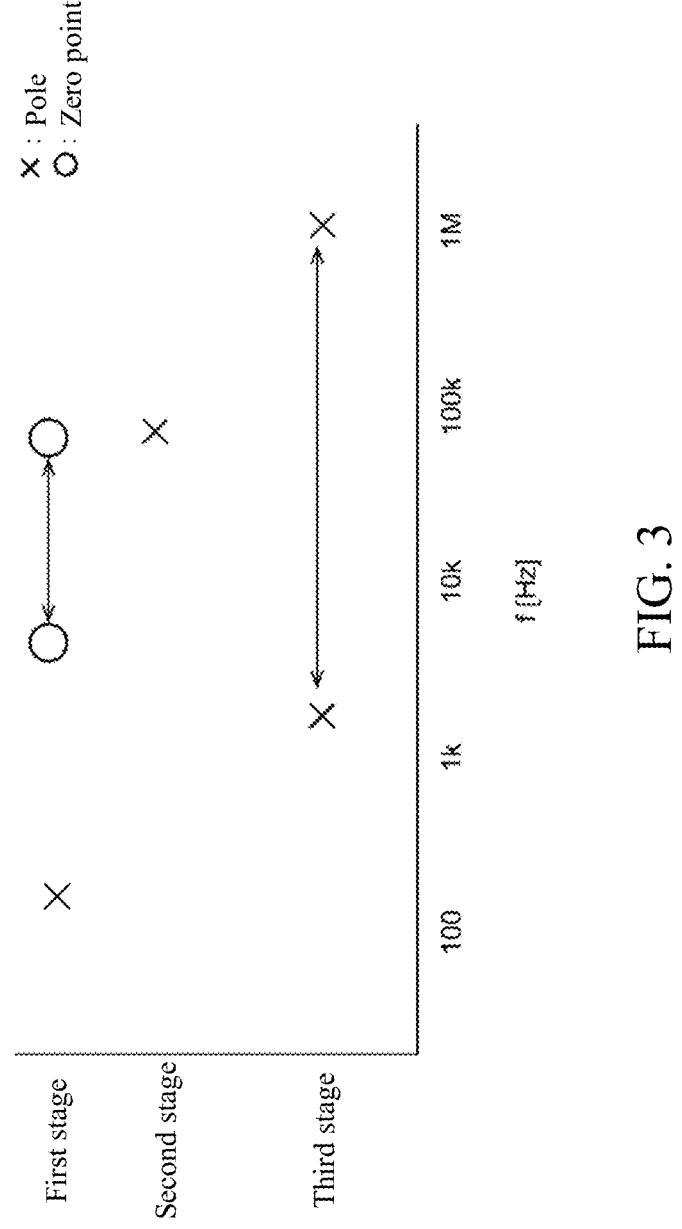
FIG. 3 is a diagram illustrating adaptive phase compensation of a charging circuit.

FIG. 3 shows a diagram illustrating adaptive phase compensation of the charging circuit 200. In FIG. 3, a sign "x" represents poles of the first stage, the second stage and the third stage. The frequency of the third pole varies within a range between, for example, 1 kHz and 1 MHz, and the frequency of the third pole moves more toward the high frequency side as the resistance value of the current setting resistor $R_{ICHG}$ gets smaller, that is, as the set value of the charging current $I_{CHG}$ gets larger.

In FIG. 3, a sign "O" represents a zero point introduced by the phase compensation circuit 214. According to the size of the charging current $I_{CHG}$, in other words, according to the current setting resistor $R_{ICHG}$, the circuit constant of the phase compensation circuit 214 is changed, so as to adaptively set the position of the zero point of the first stage according to the third pole.

When the charging current $I_{CHG}$ is variable within a range between 1 mA and 300 mA, the resistance value of the current setting resistor $R_{ICHG}$ changes by 300 times, and hence the position (frequency) of the third pole is also variable within a range of 300 times. If a fluctuation in a power supply voltage or a fluctuation in the temperature is further considered, the frequency of the third pole may even change within a range (a range between 1 kHz and 1 MHz, for example) of 1000 times.

In one embodiment, a resistance value of the first resistor R1 may be used as a variable phase compensation parameter of the constant current feedback circuit 210, and the first resistor R1 may then be configured as a variable resistor having a resistance value that varies according to the charging current $I_{CHG}$.

Figure 4:
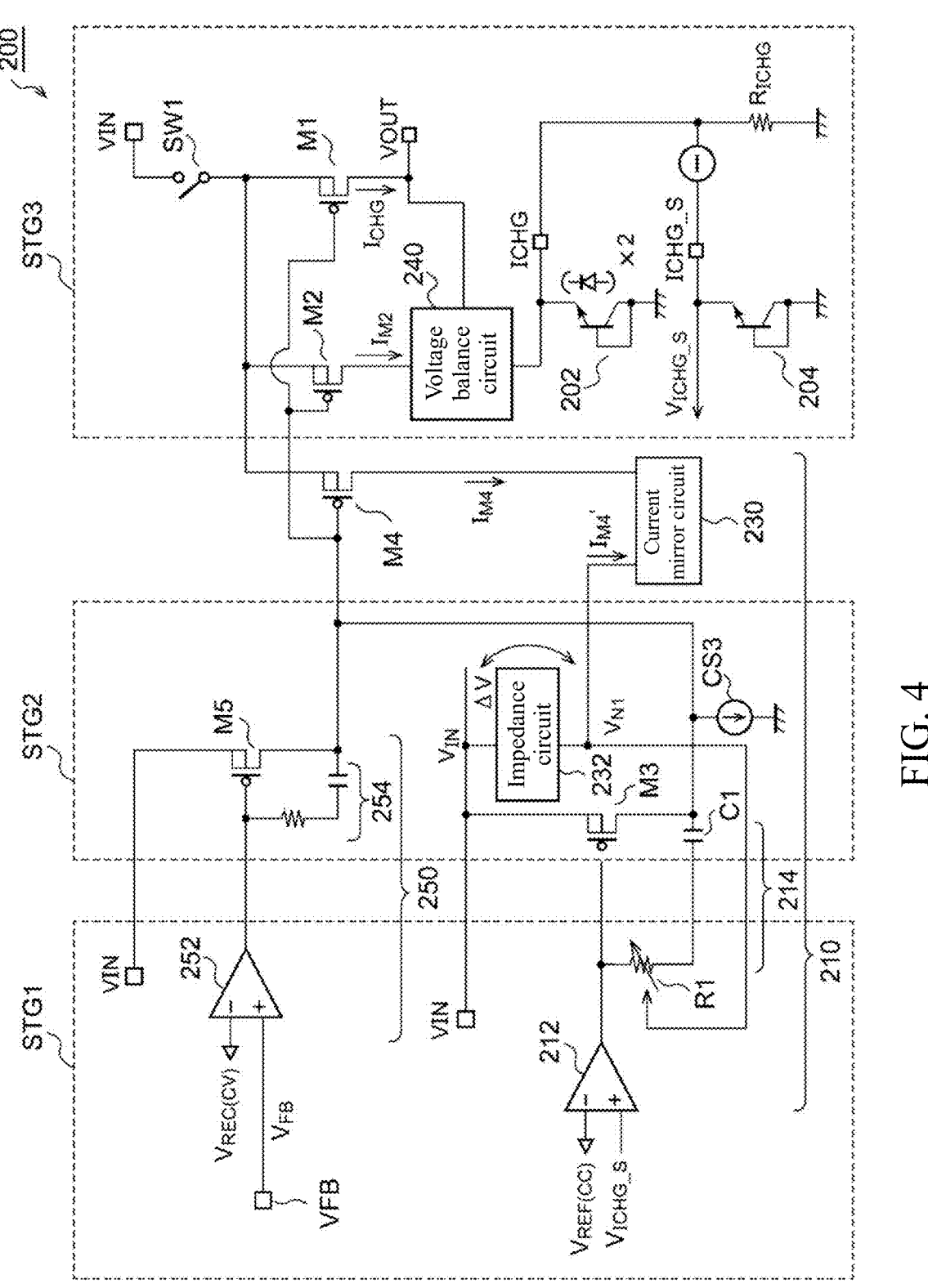
FIG. 4 is a circuit diagram of a charging circuit according to an embodiment.

FIG. 4 shows a circuit diagram of the charging circuit 200 according to an embodiment. In this embodiment, the resistance value of the first resistor R1 of the phase compensation circuit 214 is adaptively controlled according to the charging current $I_{CHG}$.

In addition to the third transistor M3, the phase compensation circuit 214 and the constant current load CS3, the constant current feedback circuit 210 further includes a fourth transistor M4, a current mirror circuit 230 and an impedance circuit 232 so as to implement adaptive phase compensation.

The fourth transistor M4 has a gate connected to the gate of the first transistor M1 and a source connected to a source of the first transistor M1. Thus, a current IM4 proportional to the charging current $I_{CHG}$ flowing through the first transistor M1 flows in the fourth transistor M4. The current mirror circuit 230 folds back the current $I_{M4}$. The impedance circuit 232 is connected between the input terminal VIN and an output node of the current mirror circuit 230, and generates a voltage drop $\Delta V$ corresponding to a current $I_{M4}'$ folded back by the current mirror circuit 230, and more specifically, a voltage drop $\Delta$ positively correlated with the current $I_{M4}'$.

The first resistor R1 is a variable resistor, and has its resistance value variable according to a voltage $V_{N1}=V_{IN}-\Delta V$ of a connection node of the impedance circuit 232 and the current mirror circuit 230. More specifically, the resistance value of the first resistor R1 is variable within a range between Rc2 and Rc1 according to the voltage $V_{N1}$, where Rc2<R1<Rc1.

A switch SW1 is inserted between the source of the first transistor M1 and the input terminal VIN.

FIG. 4 shows a constant voltage feedback circuit 250 used for the CV mode. A differential amplifier 252, a fifth transistor M5, a phase compensation circuit 254 and a constant current load CS3 together form the constant voltage feedback circuit 250. A feedback voltage $V_{FB}$ corresponding to an output voltage $V_{OUT}$, that is, the voltage of the battery 102, is input to a feedback terminal VFB. For example, the feedback voltage $V_{FB}$ is a voltage from dividing the voltage of the battery.

The differential amplifier 252 is an error amplifier that amplifies an error between the voltage $V_{FB}$ of the feedback terminal VFB and a target reference voltage $V_{REF(CV)}$ of the feedback terminal VFB, and has an output connected to a gate of the fifth transistor M5. In the CV mode, the charging current $I_{CHG}$ is controlled in a manner that the voltage $V_{OUT}$ of the battery approaches the target voltage $V_{OUT(REF)}$ determined according to the reference voltage $V_{REF(CV)}$.

In addition, the charging circuit 200 in FIG. 4 is provided with a voltage balance circuit 240. In the configuration in FIG. 2 excluding the voltage balance circuit 240, the drain voltage of the first transistor M1 is the battery voltage of the output terminal VOUT, and on the other hand, the drain voltage of the second transistor M2 becomes the voltage $V_{ICHG}$ of the current setting terminal ICHG, that is, the reference voltage $V_{REF(CC)}$, and these two are different. Thus, the drain-source voltages of the first transistor M1 and the second transistor M2 become unbalanced, and a current ratio A between the first transistor M1 and the second transistor M2 changes. The change in the ratio A causes reduced precision of the charging current $I_{CHG}$.

The voltage balance circuit 240 in FIG. 4 causes the drain voltage of the second transistor M2 to approach the drain voltage of the first transistor M1, so that the drain-source voltage of the first transistor M1 and the drain-source voltage of the second transistor M2 become equal, thereby stabilizing the current ratio A between first transistor M1 and the second transistor M2. Accordingly, the charging current $I_{CHG}$ can be controlled with high precision.

Figure 5:
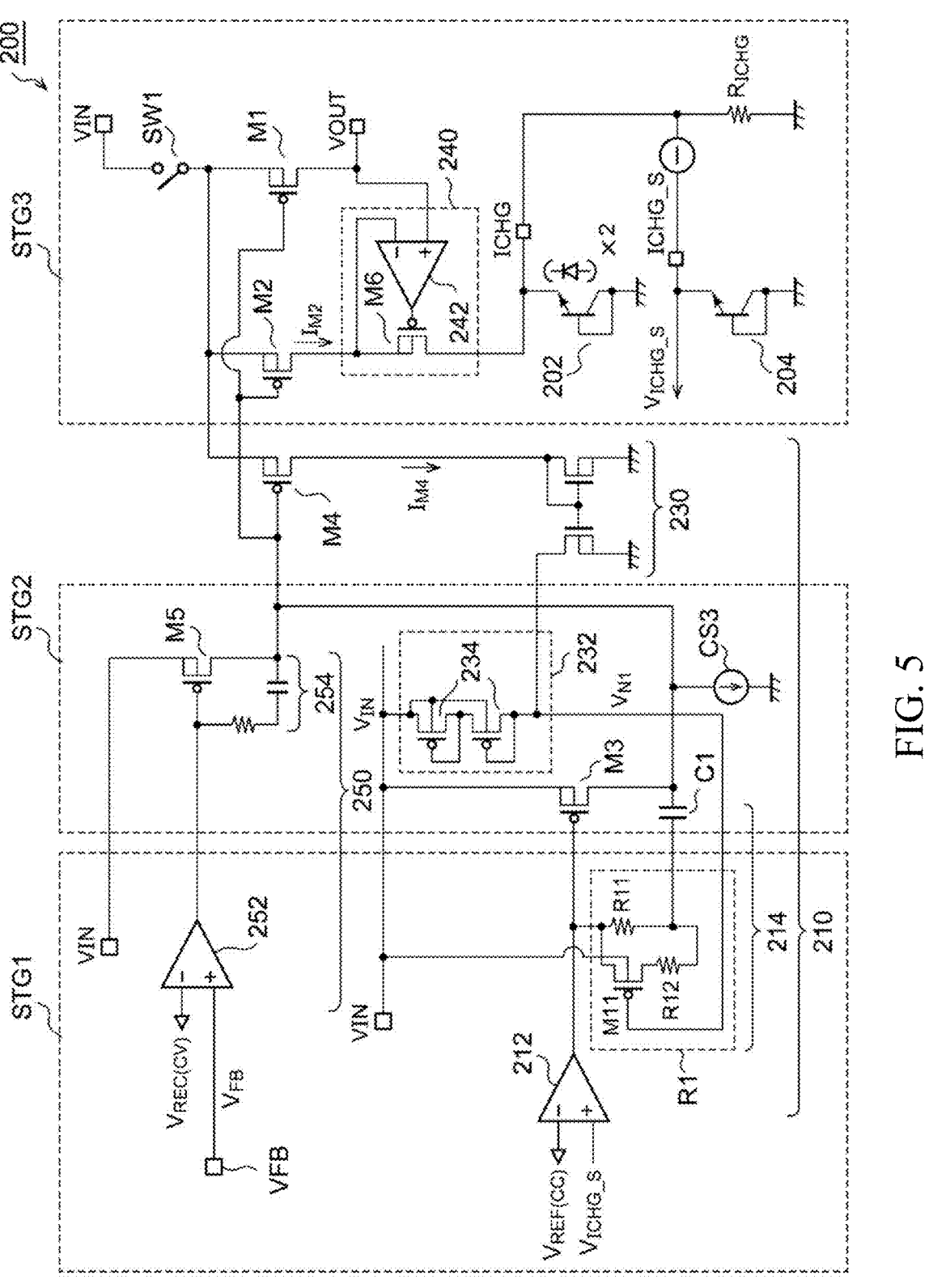
FIG. 5 is a circuit diagram of a specific configuration example of the charging circuit in FIG. 4.

FIG. 5 shows a circuit diagram of a specific configuration example of the charging circuit 200 in FIG. 4. The impedance circuit 232 includes, for example, a second P-type transistor 234 in which a gate/drain is connected. In this example, two P-type transistors 234 are shown; however, the number of such can be determined according to the voltage drop $\Delta V$ desired to be generated in the impedance circuit 232. The impedance circuit 232 may also be implemented by a resistor; however, in this case, the temperature characteristics of the resistance value or non-uniformity of a process may affect the position of the zero point. In contrast, when the impedance circuit 232 is implemented by a P-type transistor, and more specifically, by a P-channel MOSFET, the characteristics of the P-type transistor 234 follow the characteristics of other P-type transistors, so that the position of the zero point can be stabilized.

In this configuration example, the first resistor R1 includes a first resistor element R11, a second resistor element R12 and a P-type transistor M11. The second resistor element R12 and the P-type transistor M11 are connected in series between both ends of the first resistor element R11. The voltage $V_{N1}$ is input to a gate of the P-type transistor M11.

When the charging current $I_{CHG}$ is small, in other words, when the current setting resistor $R_{ICHG}$ is large, the current $I_{M4}$ flowing through the fourth transistor M4 is decreased, and so the voltage drop $\Delta V$ of the P-type transistor 234 becomes smaller, and $V_{N1}{\approx}V_{IN}$. In this case, the P-type transistor M11 is turned off, and so the resistance value Rc1 of the first resistor R1 is equal to that of the first resistor element R11.

$$Rc1=R11$$

At this point in time, the zero point is located on a lowermost side of the frequency.

When the charging current $I_{CHG}$ is large, in other words, when the current setting resistor $R_{ICHG}$ is small, the current $I_{M4}$ flowing through the fourth transistor M4 is increased, and so the voltage drop $\Delta V$ of the P-type transistor 234 becomes larger. In this case, a gate-source voltage of the P-type transistor M11 becomes larger and a fully turned on state is achieved, and so the resistance value Rc2 of the first resistor R1 becomes being connected in parallel with the first resistor element R11 and the second resistor element R12, where "//" represents a combined resistance of the parallel resistances.

$$Rc2=R11//R12$$

The decrease in the resistance value of the first resistor R1 causes the zero point to shift to the high frequency side.

That is to say, according to the configuration in FIG. 5, the resistance value of the first resistor R1 can be controlled to be within a range of Rc2<R1<Rc1 to shift the zero point.

Herein, adaptive phase compensation performed using shifting of a zero point is described; however, other approaches may also be used.

Figure 6:
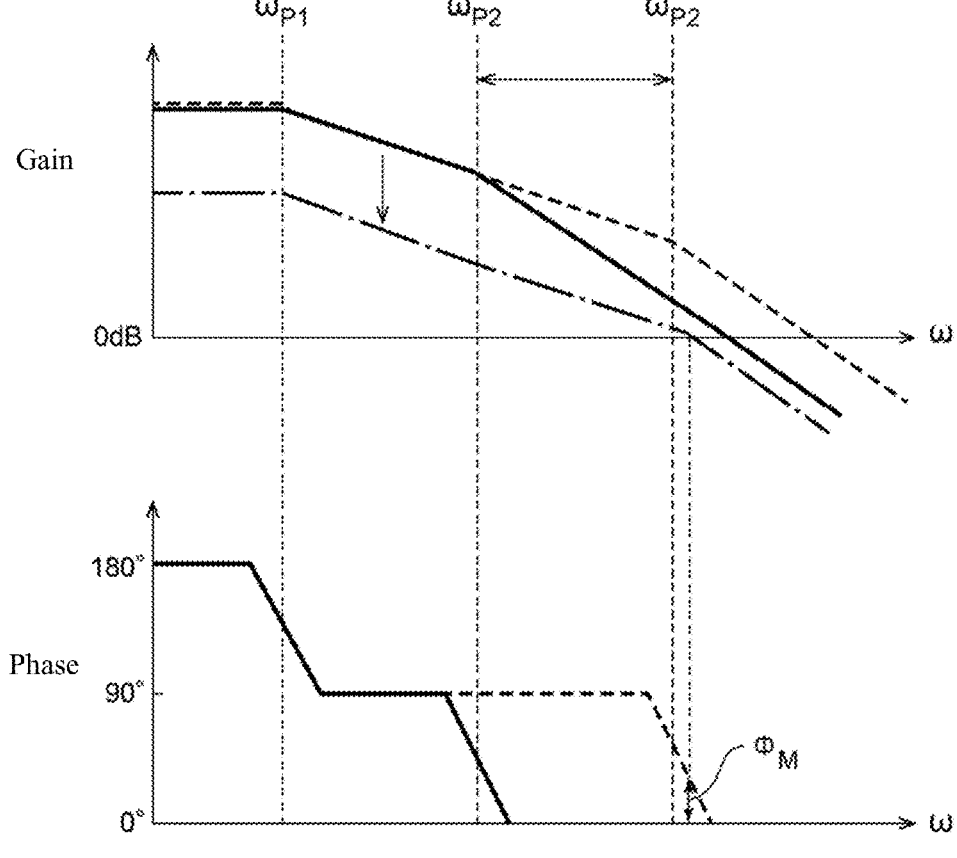
FIG. 6 is a diagram illustrating adaptive phase compensation based on loop gain reduction.

FIG. 6 shows a diagram illustrating adaptive phase compensation based on loop gain reduction. For the sake of simplicity, a Bode plot of a two-stage amplifier is shown in the drawing. The solid lines indicate gain characteristics and phase characteristics when a second pole $\omega_{P2}$ is low, and the dotted lines indicate gain characteristics and phase characteristics when the second pole $\omega_{P2}$ is high. Given that adaptive phase compensation is not performed, when the second pole $\omega_{P2}$ is high, the phase rotates by 180° under a frequency of one single gain, and a vibration is resulted.

In contrast, in adaptive phase compensation based on loop gain reduction, as shown by the single-dash dotted line, the loop gain is reduced as the second pole $\omega_{P2}$ becomes higher. Accordingly, reducing the frequency of one single gain can ensure a phase margin $\phi_M$.

Figure 7:
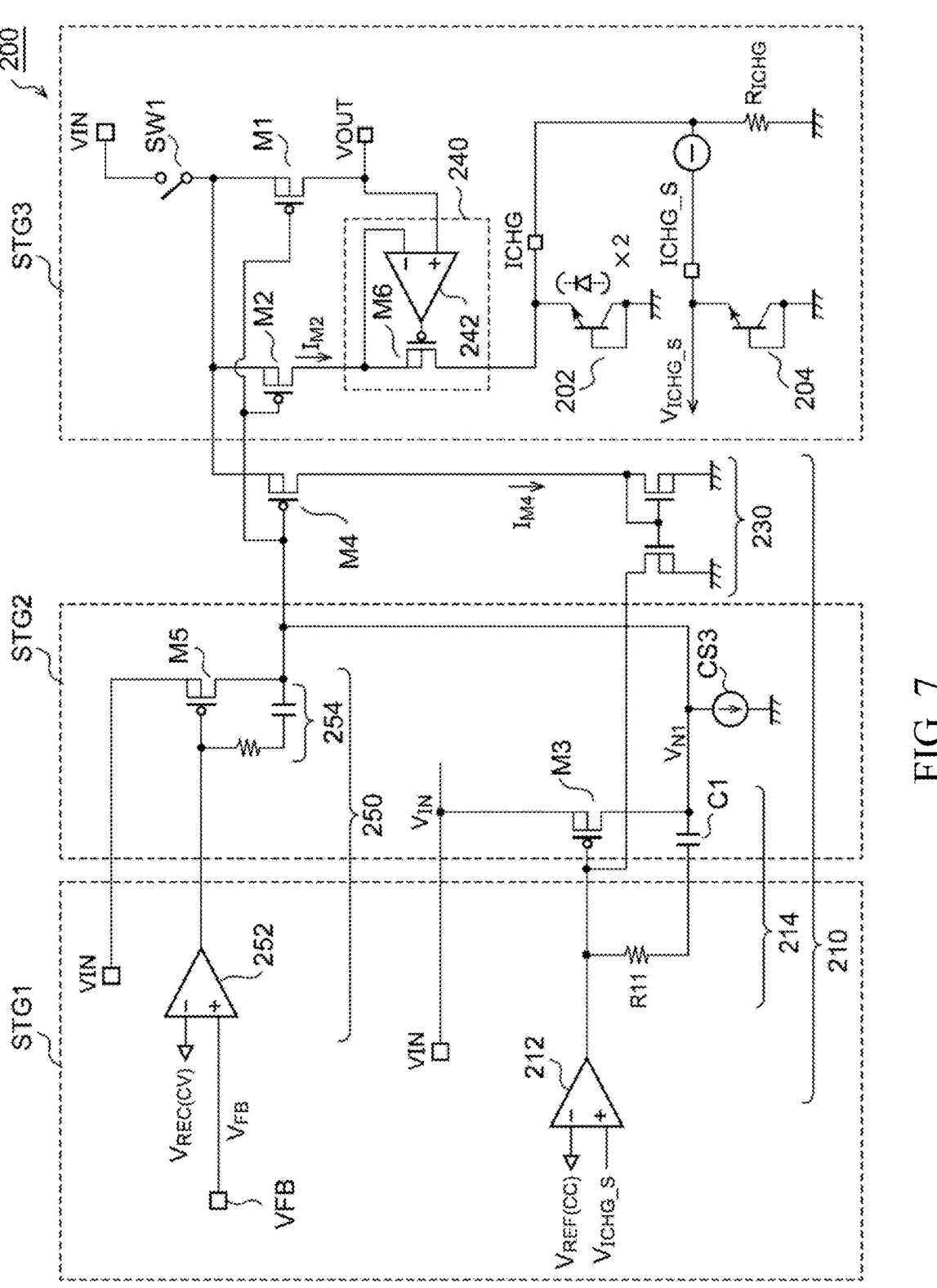
FIG. 7 is a circuit diagram of another configuration example of a charging circuit.

FIG. 7 shows a circuit diagram of another configuration example of the charging circuit 200. In this configuration example, the output of the current mirror circuit 230 is connected to the gate of the third transistor M3, and the current mirror circuit 230 sinks the current $I_{M4}'$ proportional to the charging current $I_{CHG}$ from the gate of the third transistor M3.

Figure 8:
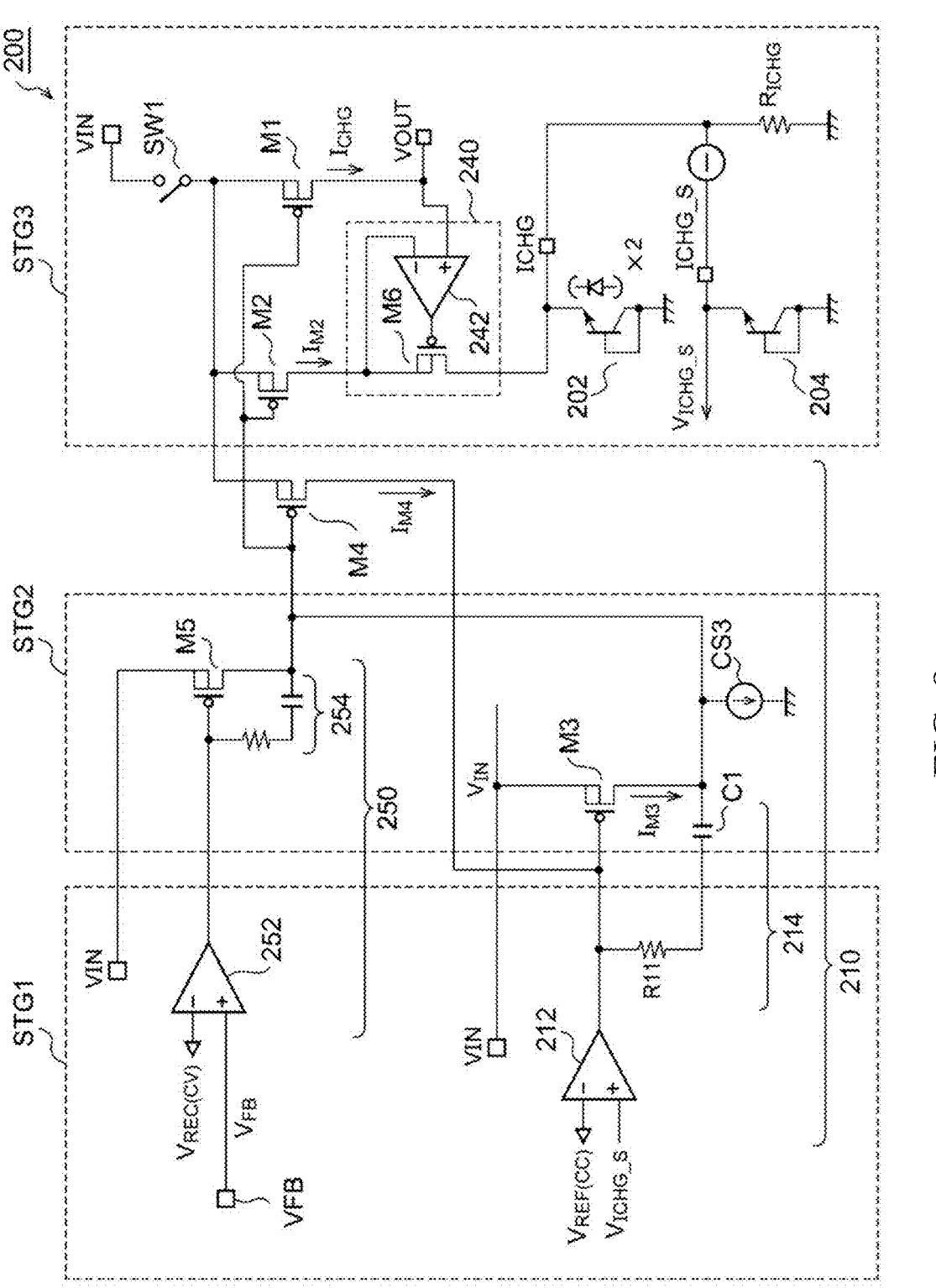
FIG. 8 is a circuit diagram of a variation example of the charging circuit in FIG. 7.

FIG. 8 shows a circuit diagram of a variation example of the charging circuit 200 in FIG. 7. In this variation example, a drain of the fourth transistor M4 is connected to the gate of the third transistor M3, and pulls the current $I_{M4}'$ proportional to the charging current $I_{CHG}$ to the gate of the third transistor M3.

According to the configuration in FIG. 7 or FIG. 8, the gain of the second stage is changed according to the charging current $I_{CHG}$, further changing the loop gain.

Figure 9:
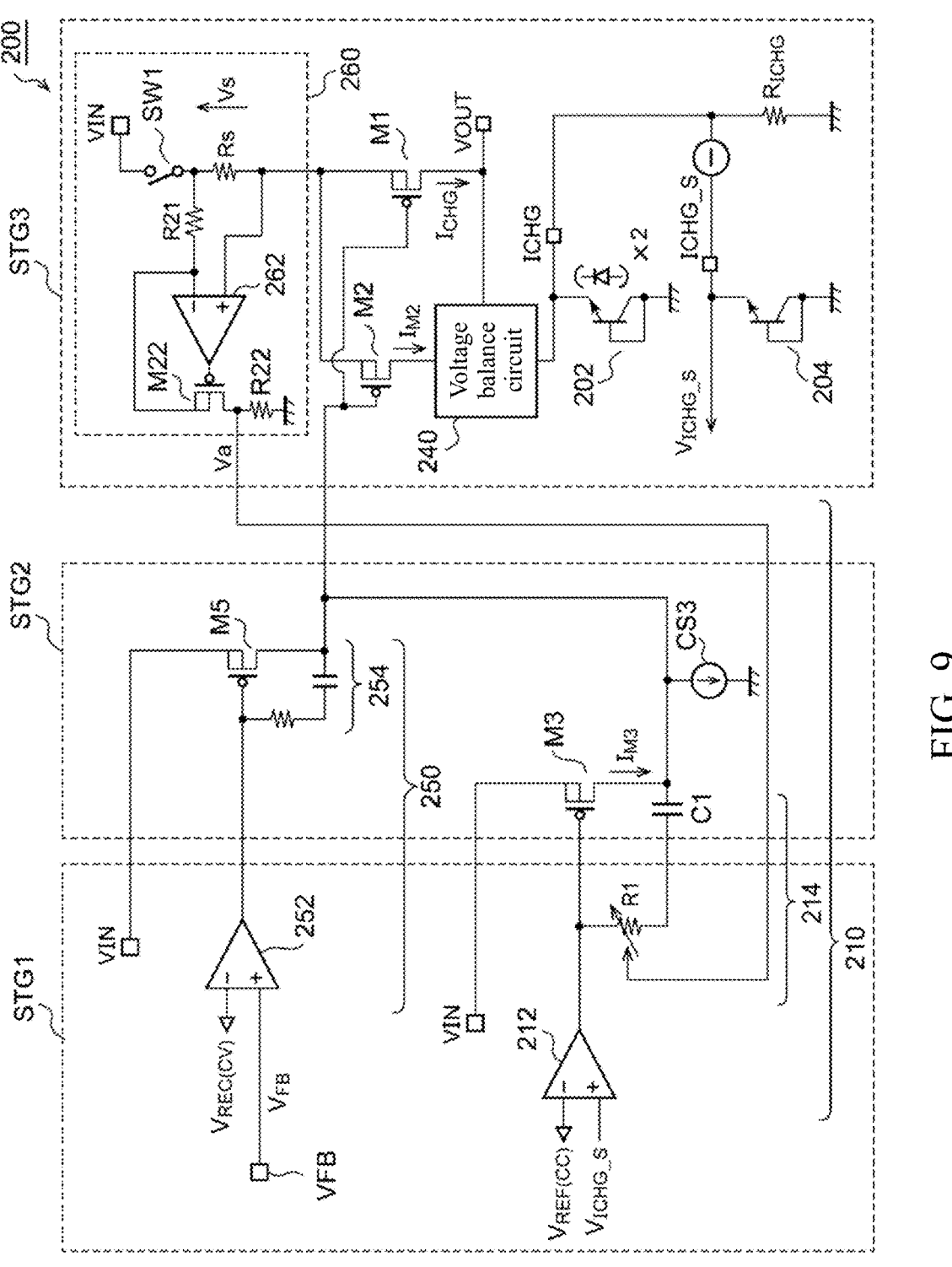
FIG. 9 is a circuit diagram of another configuration example of a charging circuit.

FIG. 9 shows a diagram of another configuration example of the charging circuit 200. In the configuration examples in FIG. 4, FIG. 5, FIG. 7 and FIG. 8, the charging current $I_{CHG}$ of the first transistor M1 is duplicated by the fourth transistor M4, and adaptive phase compensation is performed based on the duplicated current $I_{M4}$; however, the present disclosure is not limited to the examples above. In the charging circuit 200 in FIG. 9, a sense resistor Rs connected in series with the first transistor M1 is inserted, and adaptive phase compensation is implemented based on a voltage drop Vcs of the sense resistor Rs.

In this configuration example, similar to the configuration example in FIG. 5, the resistance value of the first resistor R1 is adaptively changed according to the voltage drop of the sense resistor Rs, in other words, according to the charging current $I_{CHG}$.

An amplifier 260 includes resistors R21 and R22, a transistor M22, and a differential amplifier (an error amplifier) 262. When a virtual short in the differential amplifier 262 is established, a voltage drop $R_S \times I_{CHG}$ of the resistor Rs is equal to a voltage drop $R21 \times Ia$ of the resistor R21. That is to say, a current Ia flowing through the resistor R21 is proportional to the charging current $I_{CHG}$.

$$Ia = I_{CHG} \times Rs/R21$$

The current Ia flows through the transistor M22 and the resistor R22. Thus, an output voltage Va of the amplifier 260 is represented by an equation below, and is proportional to the charging current $I_{CHG}$.

$$Va = Ia \times R22 = I_{CHG} \times Rs \times R22/R21$$

The resistance value of the first resistor R1 of the phase compensation circuit 214 can be controlled according to the voltage Va. Accordingly, the position of the pole can be adaptively shifted.

Figure 10:
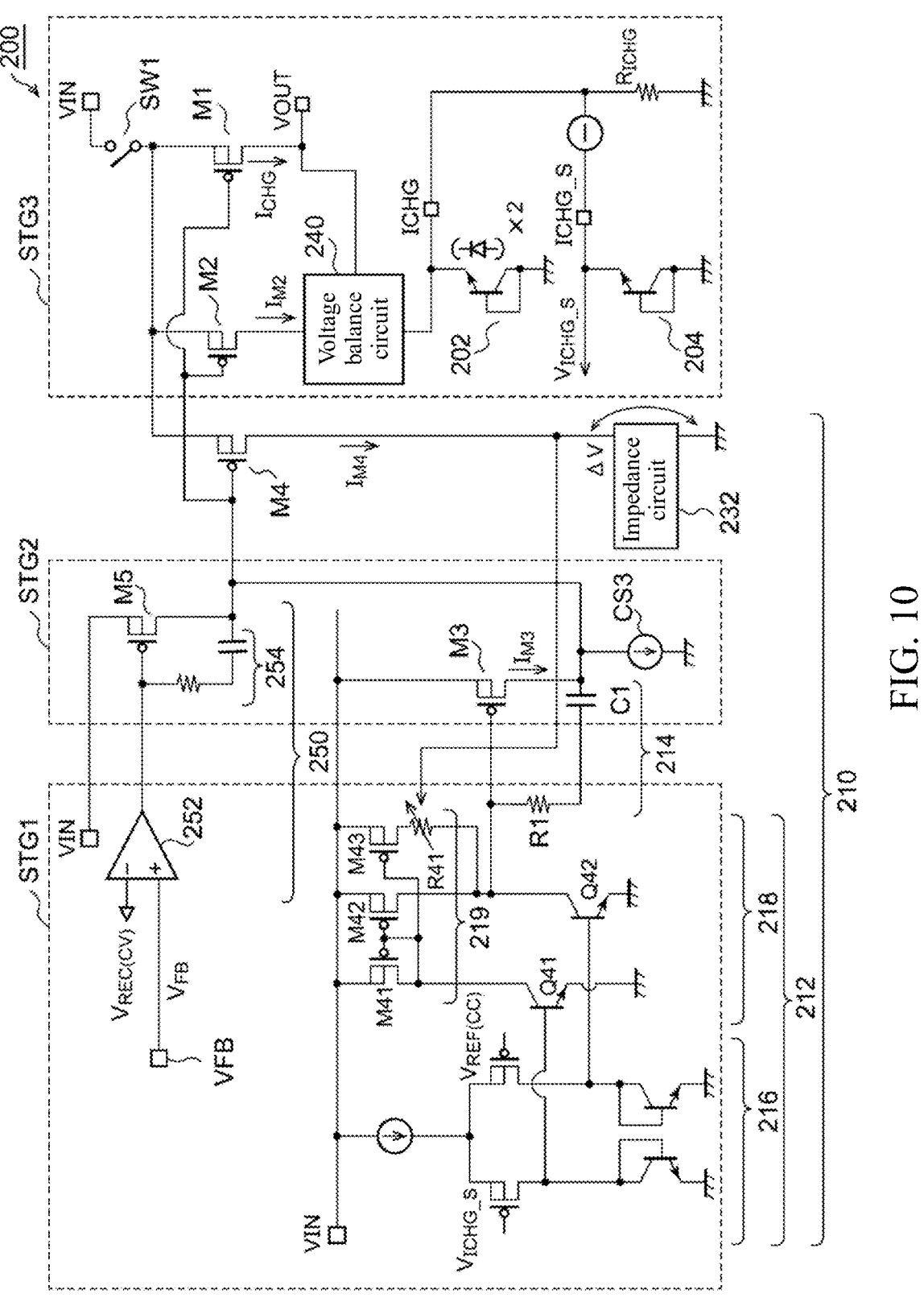
FIG. 10 is a circuit diagram of yet another configuration example of a charging circuit.

FIG. 10 shows a circuit diagram of yet another configuration example of the charging circuit 200. The differential amplifier 212 of the constant current feedback circuit 210 includes a differential input stage 216 and an amplification stage 218. The differential input stage 216 receives the voltage signal $V_{ICHG\_S}$ of the current setting terminal $I_{CHG}$ and the reference voltage $V_{REF(CC)}$. The amplification stage 218 is an emitter-grounded type (or source-grounded type) amplification stage that amplifies a differential output signal of the front-stage amplification stage 218.

The constant current feedback circuit 210 may also be configured in a manner that an output impedance of the amplification stage 218 is variable according to the current $I_{CHG}$ flowing through the first transistor M1. The emitter-grounded type amplification stage 218 includes an emitter-grounded transistor pair Q41 and Q42, and a collector load 219 connected to collectors thereof. In this configuration example, an impedance (collector impedance) of the collector load 219 of the amplification stage 218 is variable.

The collector load 219 includes transistors M41 to M43 forming a current mirror circuit, and a variable resistor R41. The fourth transistor M4 and the impedance circuit 232 are disposed in order to the control a resistance value of the variable resistor R41. The current $I_{M4}$ proportional to the charging current $I_{CHG}$ flowing through the first transistor M1 flows in the fourth transistor M4, and the voltage drop $\Delta V$ proportional to the current $I_{M4}$, that is, proportional to the charging current $I_{CHG}$, is generated in the impedance circuit 232. The resistance value of the variable resistor R41 varies according to the voltage drop $\Delta V$.

The collector load of the transistor Q42 is a combined resistance of the transistors M42 and M43 and the variable resistor R41. Thus, with the resistance value of the variable resistor R41 that varies according to the charging current $I_{CHG}$, the impedance of one collector of the differential output of the amplification stage 218 is changed, so that the output impedance of the amplification stage 218 is varied.

That is to say, given a small set value of the charging current, when the resistance value $R_{ICHG}$ of the current setting resistor is large, the resistance value of the variable resistor R41 is increased as the set value of the charging current increases, that is, as the resistance value $R_{ICHG}$ of the current setting resistor gets smaller, the resistance value of the variable resistor R41 is decreased. That is to say, as the charging current $I_{CHG}$ increases, the output impedance of the amplification stage 218 is increased, and the pole of the differential amplifier 212 shifts to the low band side. Accordingly, stability can be ensured.

Figure 11:
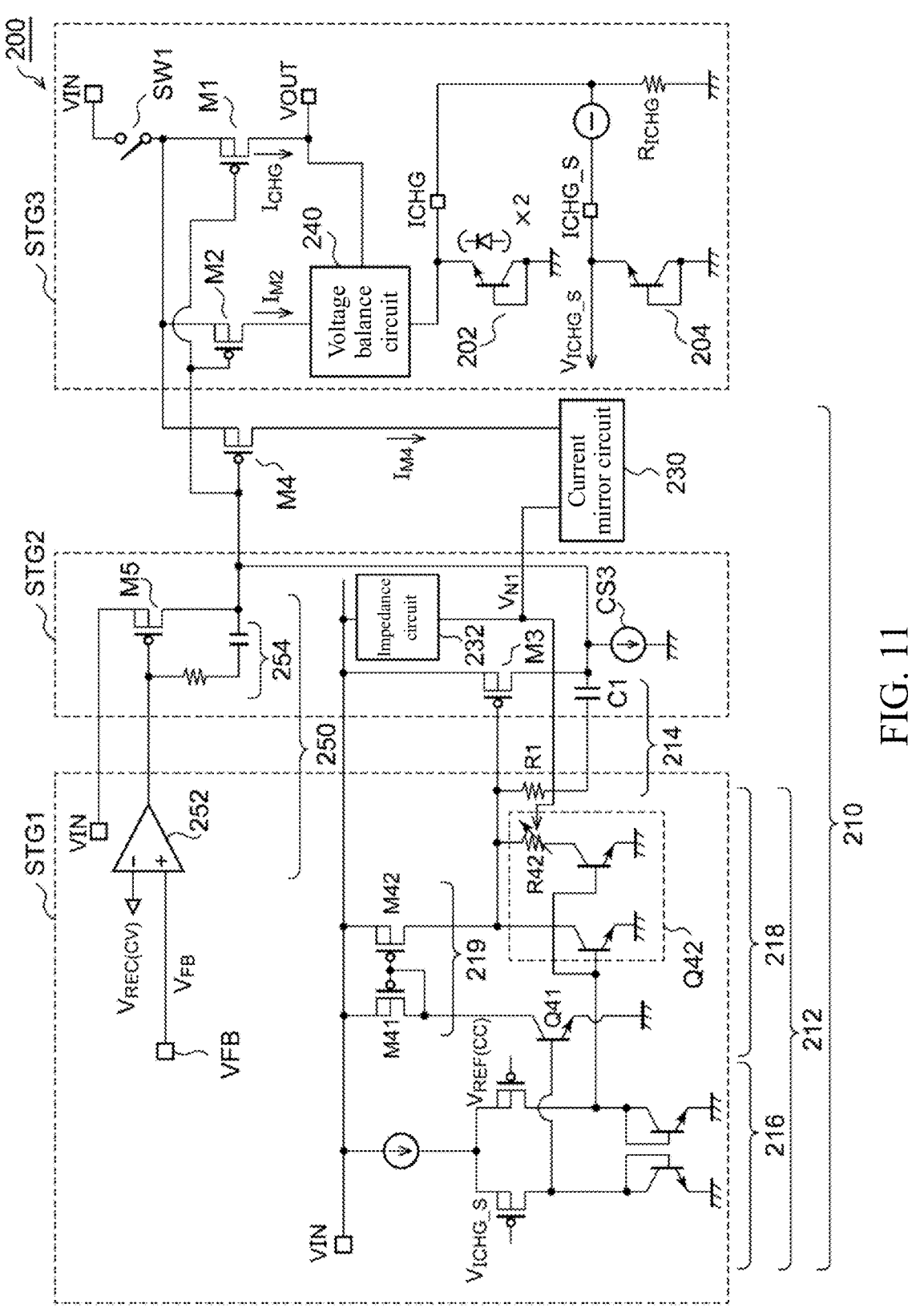
FIG. 11 is a circuit diagram of a further configuration example of a charging circuit.

FIG. 11 shows a circuit diagram of a further configuration example of the charging circuit 200. The differential amplifier 212 of the constant current feedback circuit 210 includes a differential input stage 216 and an amplification stage 218. The differential input stage 216 receives the voltage signal $V_{ICHG\_S}$ of the current setting terminal $I_{CHG}$ and the reference voltage $V_{REF(CC)}$. The amplification stage 218 is an emitter-grounded type (or source-grounded type) amplification stage that amplifies a differential output signal of the front-stage amplification stage 218.

Similar to FIG. 10, the emitter-grounded type amplification stage 218 includes an emitter-grounded transistor pair Q41 and Q42, and a collector load 219 connected to collectors thereof, and the constant current feedback circuit 210 is configured in a manner that the output impedance of the amplification stage 218 is variable according to the current $I_{CHG}$ flowing through the first transistor M1.

In FIG. 11, an impedance (in other words, a transconductance) of the emitter-grounded transistor Q42 is variable according to the current $I_{CHG}$ flowing through the first transistor M1. The output impedance of the amplification stage 218 is a combined resistance of the impedance of the transistor Q42 and the collector impedance, and thus the output impedance of the amplification stage 218 is caused to vary according to an impedance change of the transistor Q42.

The emitter-grounded transistor Q42 includes transistors Q42a and Q42b, and a variable resistor R42. If the resistance value of the variable resistor R42 is varied, a transconductance gm, in other words, an impedance of the emitter-grounded transistor Q42 then varies.

The fourth transistor M4, the current mirror circuit 230 and the impedance circuit 232 are disposed in order to the control a resistance value of the variable resistor R42. The fourth transistor M4, the current mirror circuit 230 and the impedance circuit 232 operate similarly to those of FIG. 4.

According to the charging circuit 200 in FIG. 11, as the charging current $I_{CHG}$ increases, an impedance of the transistor Q42 is increased, that is, the output impedance of the amplification stage 218 is increased, and the pole of the differential amplifier 212 shifts to the low band side. Accordingly, stability can be ensured.

Figure 12:
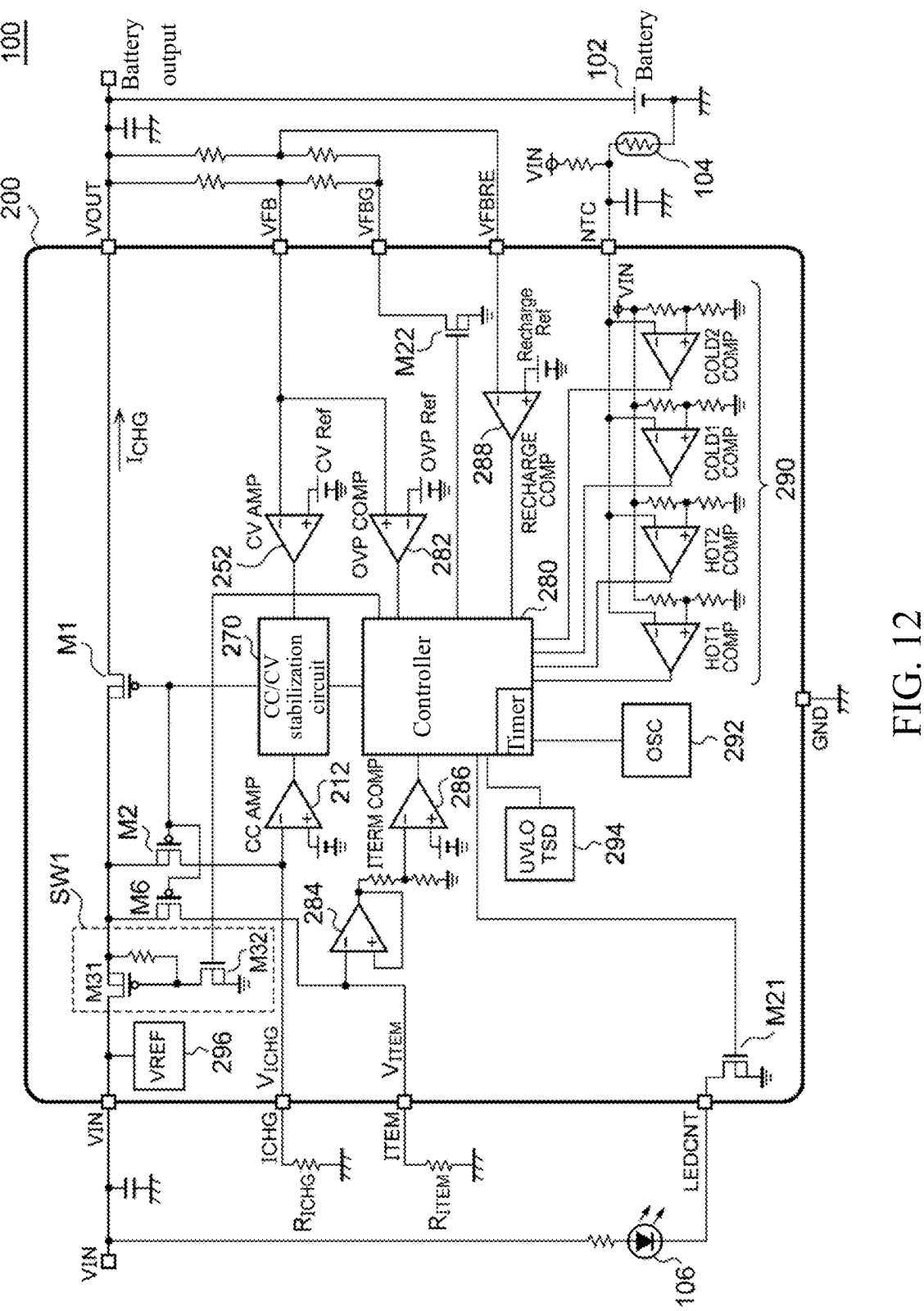
FIG. 12 is a diagram of a configuration example of a charging circuit.

FIG. 12 shows a diagram of a configuration example of the charging circuit 200. The configuration of adaptive phase compensation is omitted from FIG. 12.

A CC/CV stabilization circuit 270 includes the third transistor M3, the constant current load CS3, the fifth transistor M5 or the phase compensation circuits 214 and 254 in FIG. 4, and controls the gate voltage of the first transistor M1 according to the output of the differential amplifier 212 or the output of the differential amplifier 252.

A controller 280 comprehensively controls the entire charging circuit 200. A reference voltage source 296 includes, for example, a bandgap reference circuit, and generates a reference voltage for reference of the blocks of the charging circuit 200.

A sixth transistor M6 has a gate connected to the gate of the first transistor M1 and a source connected to a source of the first transistor M1. A current $I_{M6}$ proportional to the charging current $I_{CHG}$ flows through the sixth transistor M6. The current $I_{M6}$ flows through a resistor $R_{ITEM}$ connected to a terminal current setting terminal ITEM. A voltage $V_{ITEM}$ proportional to the charging current $I_{CHG}$ is generated in the terminal current setting terminal ITEM. The voltage $V_{ITEM}$ is input through a buffer 284 to a comparator 286. The comparator 286 compares the voltage $V_{ITEM}$ with the threshold voltage $V_{TH}$, and determines whether the charging current $I_{CHG}$ has decreased to a terminal current $I_{TERM}$. If the comparator 286 detects that the charging current $I_{CHG}$ has decreased to the terminal current $I_{TERM}$, the controller 280 stops the charging operation.

An overvoltage comparator 282 compares the voltage $V_{FB}$ of the feedback terminal VFB with the threshold voltage, and detects an overvoltage state. If an overvoltage state is detected, the controller 280 stops the charging operation.

If a voltage of recharging detection terminal VFBRE is lower than the threshold voltage, a recharging detection comparator 288 then generates a trigger for starting recharging. Once the trigger for starting recharging is received after the charging operation is complete, the controller 280 activates the CC/CV stabilization circuit 270 to start recharging.

An oscillator 292 oscillates at a predetermined frequency to generate a clock signal CLK. The controller 280 operates in synchronization with the clock signal CLK. For example, the controller 280 may include a timer 281.

A UVLO/TSD circuit 294 generates a trigger for undervoltage lockout according to the input voltage $V_{IN}$, and further generates a trigger for thermal shutdown protection according to the temperature.

A terminal NTC is connected to a thermistor 104 disposed close to the battery 102. A comparator group 290 compares a voltage of the terminal NTC with different threshold voltages, and determines a temperature status of the battery 102. The controller 280 can switch an operating state of the charging circuit 200 according to an output of the comparator group 290.

A terminal LEDCNT is connected to an external light emitting diode (LED) 106. The controller 280 controls light-on and light-off of the LED 106 by controlling on and off of the transistor M21.

The switch SW1 includes transistors M31 and M32. The controller 280 switches on and off of the transistor M31 by controlling a gate voltage of the transistor M32.

The transistor M22 is connected to a pin VFBG, and is controlled by the controller 280. When the transistor M22 is on, a voltage from dividing the output voltage $V_{OUT}$ is input to the terminal VFB and the terminal VFBRE, and when the transistor M22 is off, the output voltage $V_{OUT}$ is directly input to the terminal VFB and the terminal VFBRE.

Variation Examples

The embodiments are described as above. A person skilled in the art should understand that, the embodiments are exemplary, and variation examples may be accomplished by combinations of the constituting elements and processes, and such variation examples are encompassed within the scope of the present disclosure. Details of such variation examples are given in the description below.

In the embodiment, the resistance value of the resistor R1 of the phase compensation circuit 214 is set to be variable; however, the capacitance of the first capacitor C1 may also be selected as a variable phase compensation parameter of the constant current feedback circuit 210. The first capacitor C1 is configured as a variable capacitor having a capacitance that varies according to the charging current $I_{CHG}$.

Alternatively, the first resistor R1 may be set as a variable resistor, the first capacitor C1 may be set as a variable capacitor, so that both are variable according to the charging current $I_{CHG}$.

In FIG. 7 and FIG. 8, the gain of the second stage STG2 is changed; however, the present disclosure is not limited to such example. Alternatively, the gain of the differential amplifier 212 of the first stage STG1 may also be variable according to the charging current $I_{CHG}$.

Moreover, when the adaptive gain control illustrated with reference to FIG. 6 to FIG. 8 is performed, the gain may be controlled according to the voltage drop Vs of the sense resistor Rs instead of the current flowing through the fourth transistor M4.

The transistors represented by P-channel MOSFETs and N-channel MOSFETs in the description may be replaced by PNP bipolar transistors and NPN bipolar transistors, and in this case, the gate, source and drain are respectively renamed as the base, emitter and collector.

The embodiments described in specific terms are for conveying principles and applications of the present disclosure, and variations and modifications to the configurations may be made to these embodiments without departing from the conceptive scope of the present disclosure defined in the appended claims.

The invention claimed is:
1. A charging circuit, comprising:
an input terminal;
an output terminal;

a first transistor, connected between the input terminal and the output terminal;

a current setting terminal, to which an external current setting resistor is connectable;

a second transistor, connected between the input terminal and the current setting terminal, and having a gate connected to a gate of the first transistor; and a constant current feedback circuit, feedback-controlling a gate voltage of the first transistor in a manner that a voltage of the current setting terminal approaches a reference voltage, wherein the constant current feedback circuit is configured in a manner that a phase compensation parameter is variable according to a current flowing through the first transistor, and the constant current feedback circuit includes:

a third transistor, having a first end connected to the input terminal and a second end connected to the gate of the first transistor;

a constant current load, connected between the second end of the third transistor and a ground; and a differential amplifier, receiving the voltage of the current setting terminal and the reference voltage, and having an output node connected to a control terminal of the third transistor.

2. The charging circuit of claim 1, wherein the constant current feedback circuit further includes a first resistor and a first capacitor connected in series and between the control terminal of the third transistor and the second end, wherein at least one of a resistance of the first resistor and a capacitance of the first capacitor is the phase compensation parameter, which is variable.

3. The charging circuit of claim 2, wherein the first resistor includes:

a first resistor element; and a series transistor and a second resistor element, connected in series and between both ends of the first resistor element, wherein a state of the series transistor changes according to the current flowing through the first transistor.

4. The charging circuit of claim 1, wherein the constant current feedback circuit includes:

a first resistor element and a first capacitor, connected in series and between the control terminal of the third transistor and the second end;

a first P-type transistor and a second resistor element, connected in series and between both ends of the first resistor element;

a fourth transistor, having a gate connected to the gate of the first transistor and a source connected to a source of the first transistor;

a current mirror circuit, having an input node connected to the fourth transistor and an output node connected to the first P-type transistor; and an impedance circuit, connected between the input terminal and the output node of the current mirror circuit.

5. The charging circuit of claim 4, wherein the impedance circuit includes a second P-type transistor in which a gate/drain is connected.

6. The charging circuit of claim 1, wherein the constant current feedback circuit supplies a current proportional to the current flowing through the first transistor to the control terminal of the third transistor.

7. The charging circuit of claim 1, wherein a gain of the differential amplifier is the phase compensation parameter, which is variable.

8. The charging circuit of claim 1, wherein the differential amplifier includes:

a differential input stage; and an emitter-grounded type or source-grounded type amplification stage that amplifies an output of the differential input stage, wherein the constant current feedback circuit is configured in a manner that an output impedance of the amplification stage is variable according to a current proportional to the current flowing through the first transistor.

9. The charging circuit of claim 8, wherein a collector load or a drain load of the amplification stage is variably configured.

10. The charging circuit of claim 8, wherein an impedance of a grounded emitter transistor or a grounded source transistor of the amplification stage is variably configured.

11. A charging circuit, comprising:

an input terminal;

an output terminal;

a first transistor, connected between the input terminal and the output terminal;

a current setting terminal, to which an external current setting resistor is connectable;

a second transistor, connected between the input terminal and the current setting terminal, and having a gate connected to a gate of the first transistor; and a constant current feedback circuit, feedback-controlling a gate voltage of the first transistor in a manner that a voltage of the current setting terminal approaches a reference voltage, wherein the constant current feedback circuit is configured in a manner that a phase compensation parameter is variable according to a current flowing through the first transistor, and the constant current feedback circuit includes a fourth transistor, having a gate connected to the gate of the first transistor and a source connected to a source of the first transistor, wherein the phase compensation parameter of the constant current feedback circuit changes according to a current of the fourth transistor.

12. The charging circuit of claim 1, wherein the constant current feedback circuit includes a sense resistor connected in series with the first transistor, wherein the phase compensation parameter of the constant current feedback circuit changes according to a voltage drop of the sense resistor.

13. The charging circuit of claim 1, further comprising a voltage balance circuit connected between the second transistor and the current setting terminal to bring a voltage at one end of the second transistor closer to a voltage of the output terminal.

14. The charging circuit of claim 11, further comprising a voltage balance circuit connected between the second transistor and the current setting terminal to bring a voltage at one end of the second transistor closer to a voltage of the output terminal.

15. The charging circuit of claim 1, further comprising a constant voltage feedback circuit that feedback-controls the gate voltage of the first transistor such that a voltage of the output terminal approaches a second reference voltage.

* * * * *